(12) United States Patent
Huang

(10) Patent No.: US 7,458,730 B1
(45) Date of Patent: Dec. 2, 2008

(54) OPTICAL FIBER CONNECTOR ASSEMBLY

(76) Inventor: Erh-Te Huang, 1F, No. 13, Lane 166, Jihu Rd., Jhongshan Dist., Taipei (TW)

( * ) Notice: Subject to any disclaimer, the term of this patent is extended or adjusted under 35 U.S.C. 154(b) by 0 days.

(21) Appl. No.: 11/804,263

(22) Filed: May 17, 2007

(51) Int. Cl.
*G02B 6/36* (2006.01)
*G02B 6/38* (2006.01)

(52) U.S. Cl. ............................. 385/62; 385/53; 385/76; 385/88

(58) Field of Classification Search ................. None
See application file for complete search history.

(56) References Cited

U.S. PATENT DOCUMENTS

| | | | | |
|---|---|---|---|---|
| 4,744,624 A | * | 5/1988 | Burston | 385/76 |
| 4,798,440 A | * | 1/1989 | Hoffer et al. | 385/89 |
| 5,267,993 A | * | 12/1993 | Grace et al. | 606/11 |
| 6,234,682 B1 | * | 5/2001 | Nagaoka et al. | 385/78 |
| 6,471,418 B1 | * | 10/2002 | Yamaguchi | 385/78 |
| 6,533,468 B2 | * | 3/2003 | Nakajima et al. | 385/78 |
| 2003/0059168 A1 | * | 3/2003 | Connelly et al. | 385/58 |
| 2007/0172173 A1 | * | 7/2007 | Adomeit et al. | 385/76 |

* cited by examiner

*Primary Examiner*—Michelle R. Connelly-Cushwa
*Assistant Examiner*—Chris Chu
(74) *Attorney, Agent, or Firm*—Charles E. Baxley

(57) ABSTRACT

An optical fiber connector assembly has a sheath, a casing, an alignment pin and a spring. The sheath has a channel defined in the sheath. The casing is mounted in the channel and has a pin hole defined through the casing and communicating with the channel. The alignment pin is mounted slidably through the pin hole and the channel and has an annular flange extending radially from the alignment pin and selectively abutting the casing. The spring is mounted in the channel and presses against the annular flange to ensure the alignment pin abuts a contacting surface tightly. With the spring, the alignment pin of the optical fiber connector may press tightly and stably against an LED of a socket and improve signal transmission quality.

6 Claims, 7 Drawing Sheets

OPTICAL FIBER CONNECTOR ASSEMBLY

BACKGROUND OF THE INVENTION

1. Field of the Invention

The present invention relates to a connector assembly, and more particularly to an optical fiber connector assembly that has an alignment pin aligned stably with a light emitting diode in a socket.

2. Description of Related Art

Optical fiber cables have advantages of broad bandwidth, low signal loss and electromagnetic interference (EMI) shielding when compared with copper wire cables and are generally used in telecommunication and networking fields, especially in long-distance communications.

With reference to FIGS. 6 and 7, a conventional optical fiber connector assembly may be connected to a socket (80) in an electrical device. The socket (80) has a light emitting diode (LED) (82) mounted in the socket (80). The optical fiber connector assembly has a sheath (60) and an optical fiber connector (70). The sheath (60) has an enlarged front end, a rear end and a cavity (600). The cavity (600) is defined in the enlarged front end. The optical fiber connector (70) is mounted on the enlarged front end of the sheath (60), extends into the cavity (600) and has a casing (72), an alignment pin (74) and multiple optical fibers. The alignment pin (74) is hollow, is mounted in and protrudes out of the casing (72), and may be mounted in the socket (80). The optical fibers are mounted in the casing (72) to align the optical fibers with the LED (82) in the socket (80). A tolerance of 0.1-0.15 mm exists between the socket (80) and the optical fiber connector (70) so that the alignment pin (74) may not be aligned with the LED (82) very well causing unstable signal transmission between the optical fiber connector (70) and the socket (80).

To overcome the shortcomings, the present invention provides an optical fiber connector assembly to mitigate or obviate the aforementioned problems.

SUMMARY OF THE INVENTION

The main objective of the invention is to provide an optical fiber connector assembly that has an alignment pin aligned stably with a light emitting diode (LED) in a socket.

An optical fiber connector assembly in accordance with the present invention has a sheath, a casing, an alignment pin and a spring. The sheath has a channel defined in the sheath. The casing is mounted in the channel and has a pin hole defined through the casing and communicating with the channel. The alignment pin is mounted slidably through the pin hole and the channel and has an annular flange extending radially from the alignment pin and selectively abutting the casing. The spring is mounted in the channel and presses against the annular flange to ensure the alignment pin abuts a contacting surface tightly.

With the spring, the alignment pin of the optical fiber connector may press tightly and stably against an LED of a socket and improve signal transmission quality.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
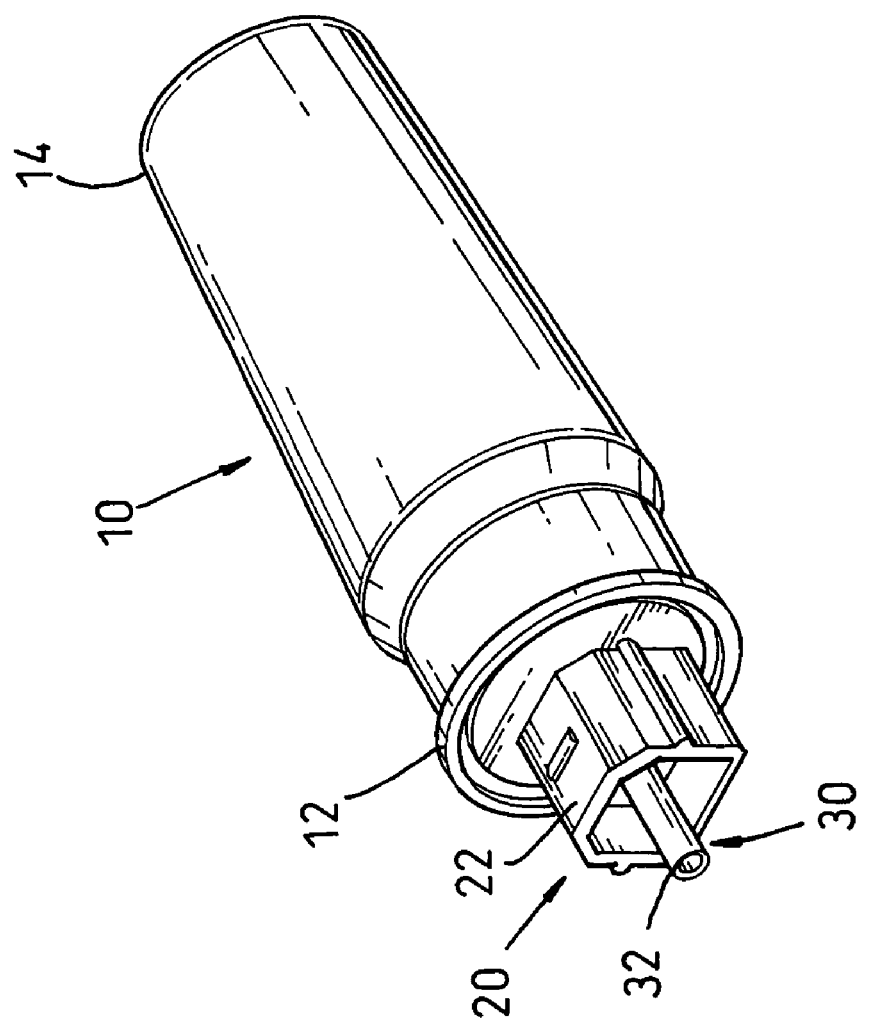
FIG. 1 is a perspective view of a first embodiment of an optical fiber connector assembly in accordance with the present invention with the optical fiber connector being a subscriber connector.
Figure 2:
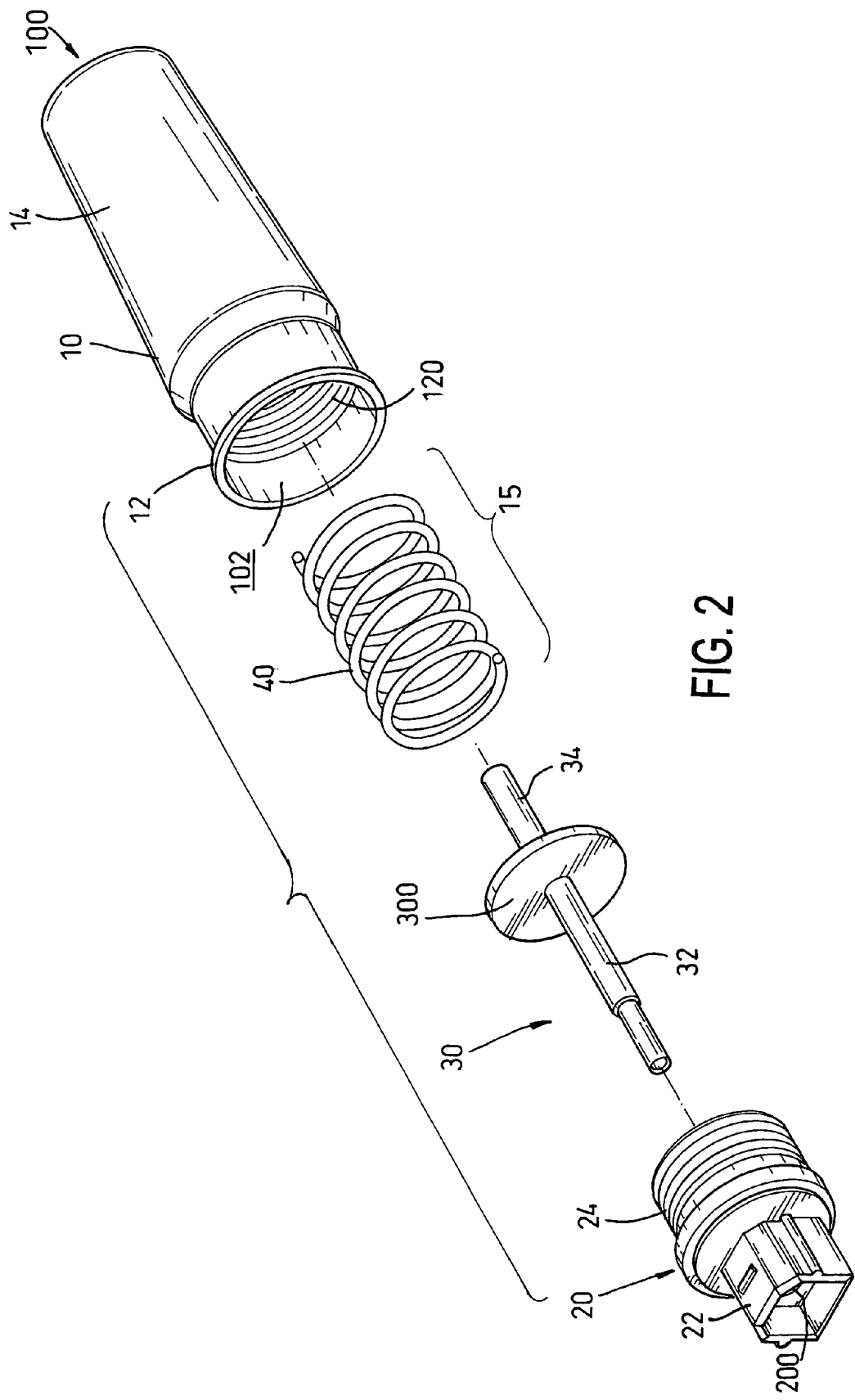
FIG. 2 is an exploded perspective view of the optical fiber connector assembly in FIG. 1.
Figure 3:
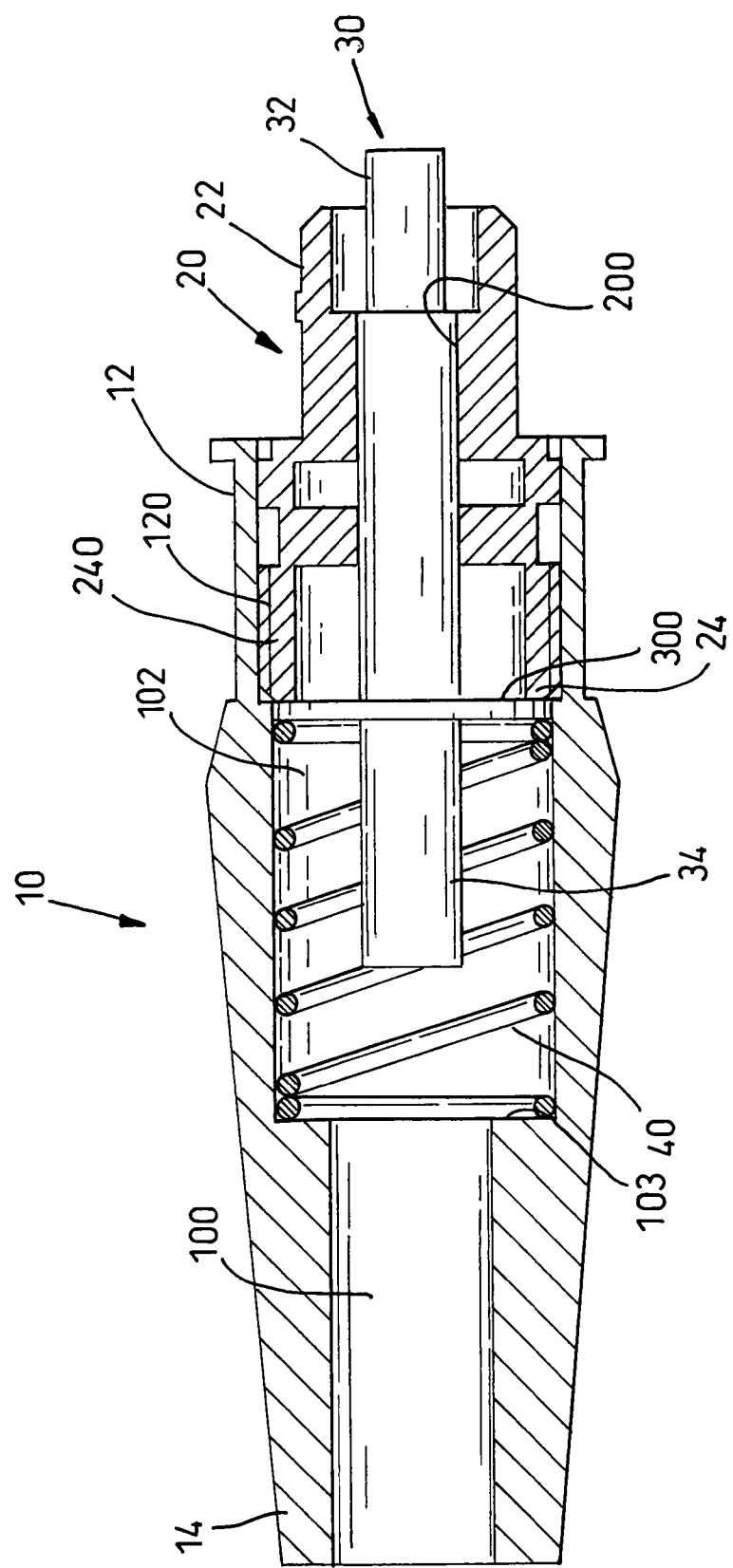
FIG. 3 is a side view in partial section of the optical fiber connector assembly in FIG. 1.
Figure 4:
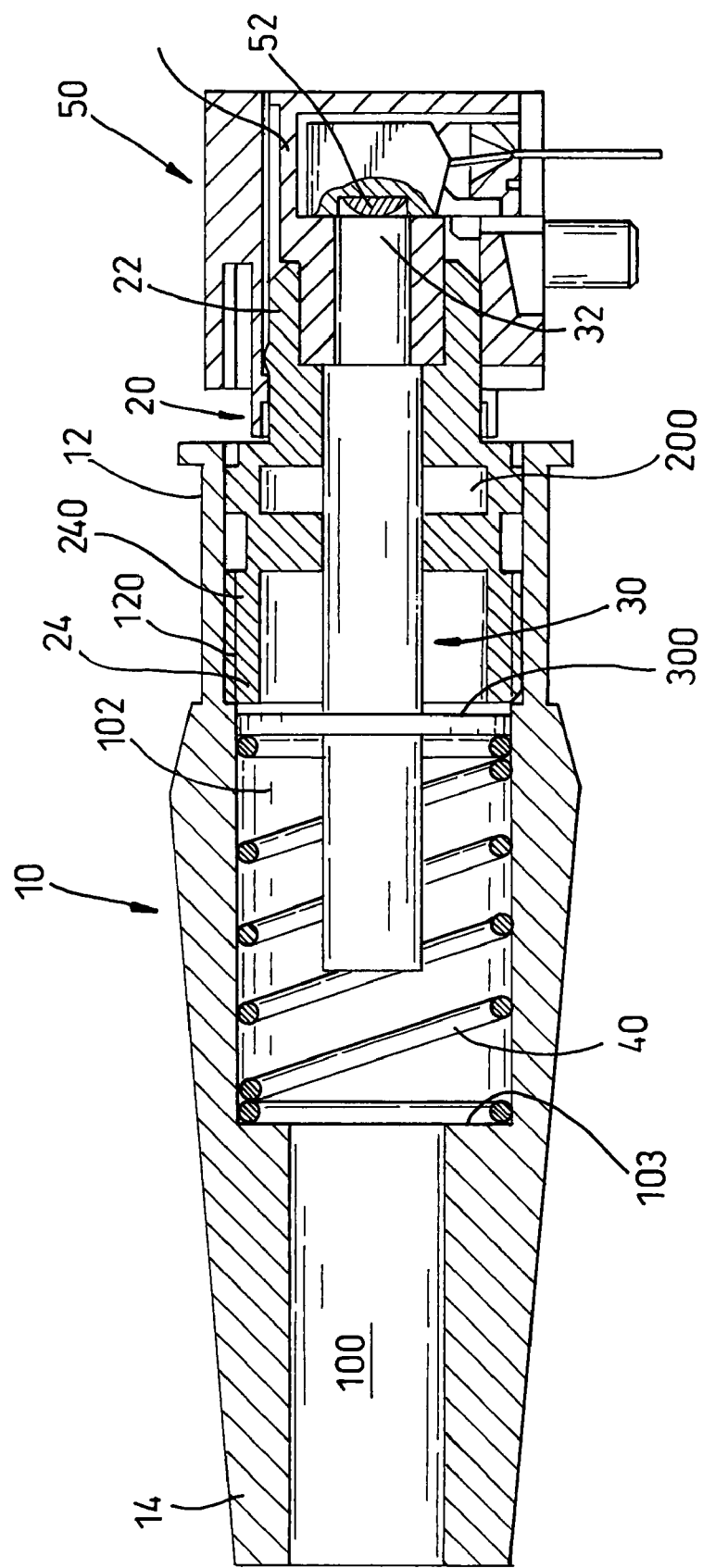
FIG. 4 is an operational side view in partial section of the optical fiber connector assembly connected to the socket.
Figure 5:
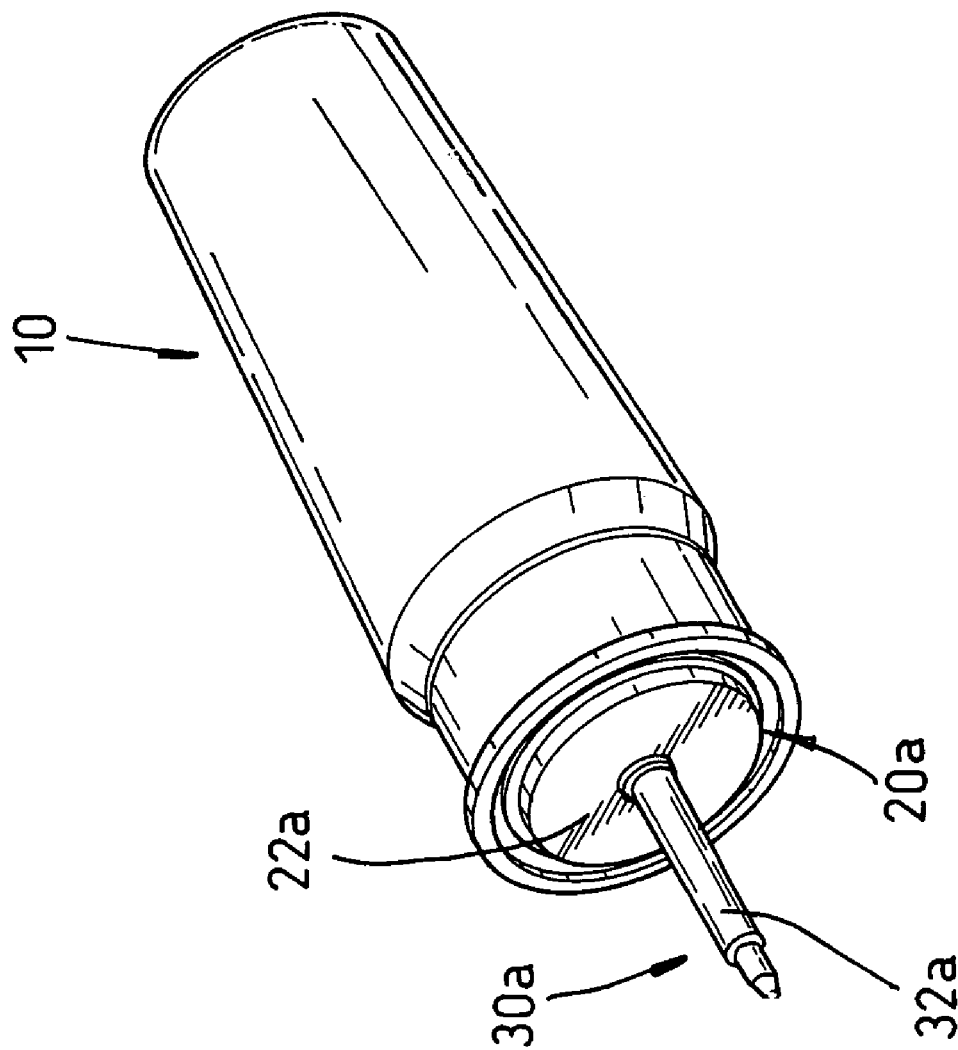
FIG. 5 is a perspective view of a second embodiment of the optical fiber connector in accordance with the present invention with the optical fiber connector being a straight tip connector.
Figure 6:
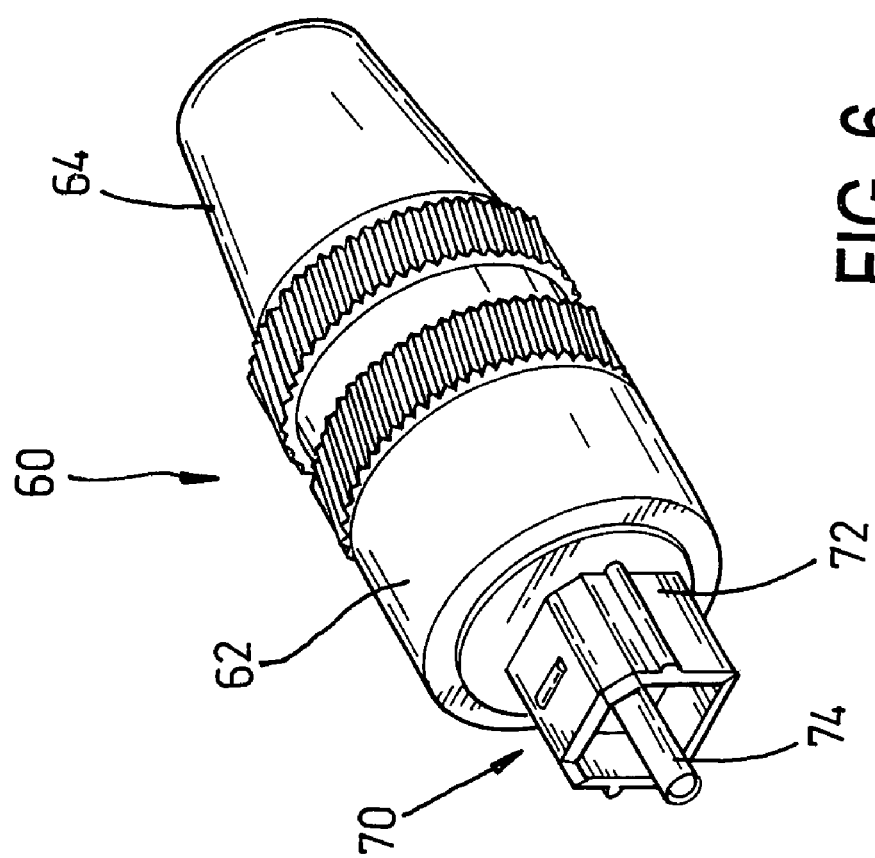
FIG. 6 is a perspective view of a conventional optical fiber connector in accordance with the prior art.
Figure 7:
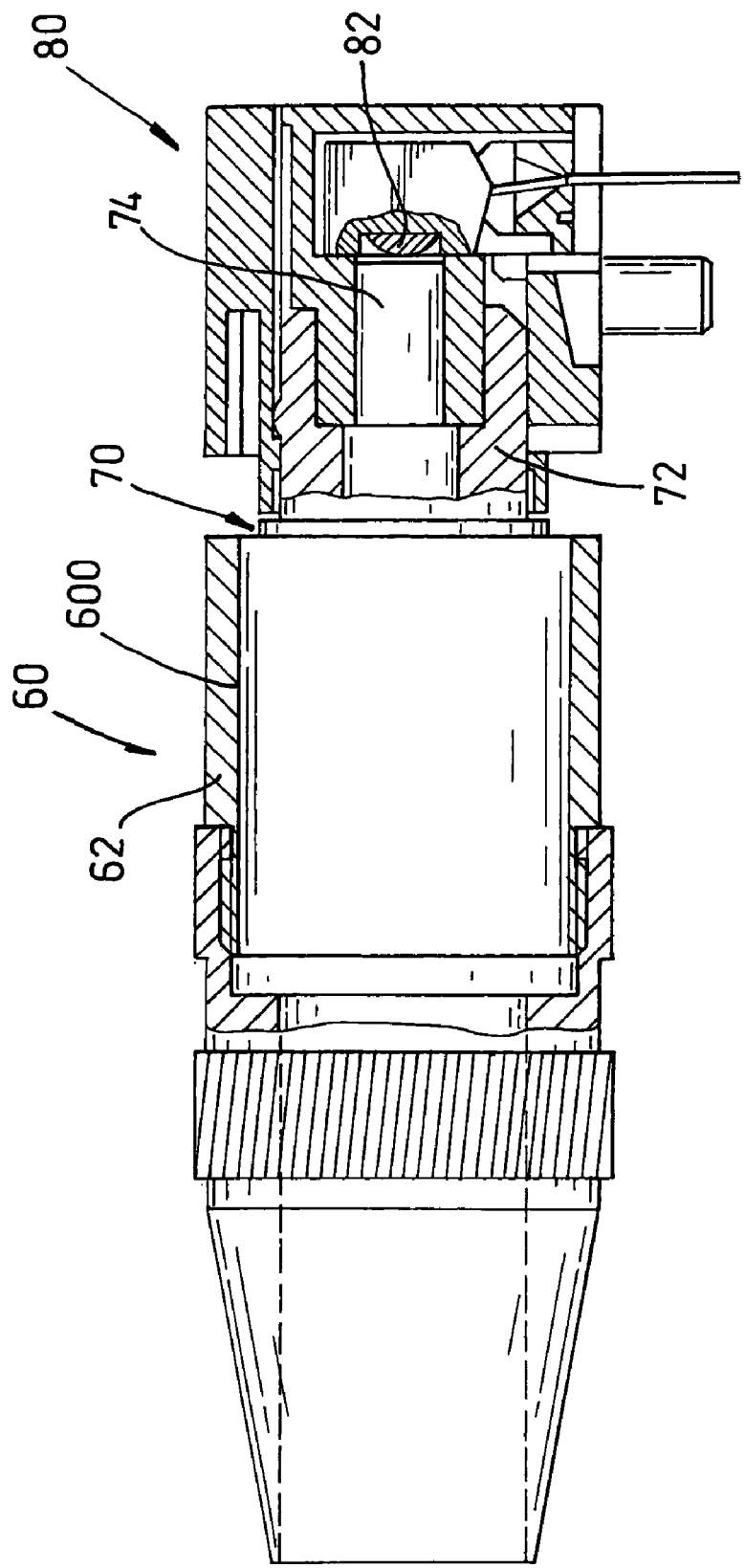
FIG. 7 an operational side view in partial section of the conventional optical fiber connector in FIG. 6 connected to a socket.

With reference to FIGS. 1 to 5, an optical fiber connector assembly in accordance with the present invention may be connected to a socket (50). The socket (50) has a cavity and a light emitting diode (LED) (52). The cavity is defined in the socket (50). The LED (52) is mounted in the cavity in the socket (50).

The optical fiber connector assembly comprises a sheath (10), an optical fiber connector and a spring (40).

The sheath (10) has a front end (12), a rear end (14), a through hole (100) and a channel (102) and may further have an inner thread (120).

The through hole (100) is defined axially through the sheath (10).

The channel (102) is defined axially in the front end (12), is aligned concentrically with and communicates with the through hole (100), is larger than the through hole (100) and has an inner end surface (103) and an inner sidewall surface. The inner end surface (103) is formed adjacent to the through hole (100) due to a difference in size between the through hole (100) and the channel (102).

The inner thread (120) is formed on the inner sidewall surface of the channel (102) near the front end (12).

The optical fiber connector is mounted in the sheath (10), may be a subscriber connector (SC) or a straight tip (ST) connector and has a casing (20) and an alignment pin (30).

The casing (20) is mounted in the channel (102), extends out of the front end (12) and has a connecting end (22), a mounting end (24), an outer surface and a pin hole (200) and may further have an outer thread (240). The connecting end (22) may be connected to the socket (50). The mounting end (24) is opposite to the connecting end (22) and is mounted detachably in the channel (102) through the front end (12) of the sheath (10). The pin hole (200) is defined axially through the casing (20) and communicates with the channel (102) in the sheath (10). The outer thread (240) is formed on the outer surface and is engaged with the inner thread (120) in the channel (102) to mount the casing (20) securely in the sheath (10).

The alignment pin (30) is formed integrally into one piece, is mounted slidably through the pin hole (200) of the casing (20) and the channel (102) of the sheath (10) and has a front end (32), a rear end (34), an outer surface and annular flange (300). The front end (32), a rear end (34), an outer surface and an annular flange (300). The front end (32) extends out of the connecting end (22) of the casing (20) and may extend in the cavity in the socket (50) to contact the LED (52). The annular flange (300) is formed on and extends radially from the outer surface between the front end and the rear end of the alignment pin (30) and selectively abuts the mounting end (24) of the casing (20) to prevent the alignment pin (30) from falling out of the casing (20).

The spring (40) is mounted in the channel (102) in the sheath (10), corresponds to the rear end (34) of the alignment pin (30) and presses against the annular flange (300) to abut the mounting end (24) of the casing (20).

When the optical fiber connector is connected to the socket (50), the spring (40) provides a resilient force to the annular flange (300) so that the front end (32) of the alignment pin (30) presses tightly against the LED (52) and prevents the alignment pin (30) retracting too far back into the channel (102) of the sheath (10).

The optical fiber connector assembly with the spring (40) pressing the alignment pin (30) tightly against the LED (52) prevents a loose connection between the optical fiber connector and the socket (50) so that the signal transmission between the optical fiber connector and the socket (50) is stable.

Even though numerous characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An optical fiber connector assembly comprising:
   a Sheath having
      a front end;
      a rear end;
      a through hole defined axially through the sheath; and
      a channel defined axially in the front end, being aligned concentrically with and communicating with the through hole and having
         an inner end surface formed adjacent to the through hole; and
         an inner sidewall surface;
   an optical fiber connector mounted in the sheath and having
      a casing mounted in the channel, extending out of the front end and having
         a connecting end;
         a mounting end being opposite to the connecting end and mounted detachably in the channel through the front end of the sheath;
         an outer surface; and
         a pin hole being defined axially through the casing and communicating with the channel in the sheath; and
      an alignment pin being formed integrally into one piece, being mounted slidably through the pin hole in the casing and the channel of the sheath and having
         a front end extending out of the connecting end of the casing;
         a rear end;
         an outer surface; and
         an annular flange being formed on an extending radially from the outer surface between the front end and the rear end of the alignment pin and selectively abutting the mounting end of the casing; and
      a spring mounted in the channel in the sheath, corresponding to the rear end of the alignment pin and pressing against the annular flange to abut the mounting end of the casing.

2. The optical fiber connector assembly as claimed in claim 1, wherein:
   the sheath further has an inner thread formed on the inner sidewall surface of the channel near the front end of the sheath; and
   the casing further has an outer thread formed on the outer surface and engaging with the inner thread of the channel.

3. The optical fiber connector assembly as claimed in claim 2, wherein the optical fiber connector is a subscriber connector (SC).

4. The optical fiber connector assembly as claimed in claim 2, wherein the optical fiber connector is a straight tip (ST) connector.

5. The optical fiber connector assembly as claimed in claim 1, wherein the optical fiber connector is a subscriber connector (SC).

6. The optical fiber connector assembly as claimed in claim 1, wherein the optical fiber connector is a straight tip (ST) connector.

* * * * *